(12) United States Patent
Wotherspoon

(10) Patent No.: US 10,929,827 B2
(45) Date of Patent: Feb. 23, 2021

(54) BASIC INPUT/OUTPUT SYSTEM (BIOS) AND UNIFIED EXTENSIBLE FIRMWARE INTERFACE (UEFI) ONE-TIME BOOT

(71) Applicant: NCR Corporation, Duluth, GA (US)

(72) Inventor: Brian Steven Wotherspoon, Fife (GB)

(73) Assignee: NCR Corporation, Atlanta, GA (US)

( * ) Notice: Subject to any disclaimer, the term of this patent is extended or adjusted under 35 U.S.C. 154(b) by 528 days.

(21) Appl. No.: 15/581,629

(22) Filed: Apr. 28, 2017

(65) Prior Publication Data
US 2018/0315031 A1    Nov. 1, 2018

(51) Int. Cl.
| | | |
|---|---|---|
| *G06F 9/4401* | (2018.01) | |
| *G06Q 20/18* | (2012.01) | |
| *G06F 21/57* | (2013.01) | |
| *G06Q 20/38* | (2012.01) | |
| *G06Q 20/40* | (2012.01) | |
| *G07F 19/00* | (2006.01) | |

(52) U.S. Cl.
CPC ........... *G06Q 20/18* (2013.01); *G06F 9/4416* (2013.01); *G06F 21/572* (2013.01); *G06Q 20/385* (2013.01); *G06Q 20/4012* (2013.01); *G07F 19/206* (2013.01)

(58) Field of Classification Search
None
See application file for complete search history.

(56) References Cited

U.S. PATENT DOCUMENTS

| | | | | | |
|---|---|---|---|---|---|
| 3,685,020 | A | * | 8/1972 | Meade | G06F 12/0897 365/230.01 |
| 5,426,775 | A | * | 6/1995 | Boccon-Gibod | G06F 9/4401 700/16 |
| 6,370,649 | B1 | * | 4/2002 | Angelo | G06F 21/31 235/382 |
| 7,849,011 | B1 | * | 12/2010 | McCoy | G06F 21/575 705/35 |
| 2006/0090201 | A1 | * | 4/2006 | Ha | G06F 21/31 726/7 |

* cited by examiner

*Primary Examiner* — Paul Yen
(74) *Attorney, Agent, or Firm* — Schwegman, Lundberg & Woessner

(57) ABSTRACT

A Basic Input/Output System (BIOS)/Unified Extensible Firmware Interface (UEFI) on a Self-Service Terminal (SST) loads ATM resources into volatile memory of the SST during a boot of the SST in a predefined order. Each time, during an SST boot, where the order is attempting to be changed; a credential is required to change the predefined order and the credential has to be authenticated before the predefined order is changed during the SST boot.

13 Claims, 4 Drawing Sheets

BASIC INPUT/OUTPUT SYSTEM (BIOS) AND UNIFIED EXTENSIBLE FIRMWARE INTERFACE (UEFI) ONE-TIME BOOT

BACKGROUND

Automated Teller Machines (ATM) are in general believed to be relatively secure devices since they handle consumer financial transactions. However, ATMs are susceptible to malware, viruses, and eavesdropping just like any other device having memory and processor capabilities.

One ATM resource that is particularly valuable to the ATM is the system firmware (Basic Input/Output System (BIOS) or Extensible Firmware Interface (UEFI)), which is utilized to boot the ATM, set resources configurations, and the like. Unauthorized access to the system firmware can create substantial security breaches at the ATM.

However, an ATM is often serviced on site by a service (field) engineer for purposes of diagnostic testing, software upgrades, peripheral replacements, and the like. As a result, the ATM may frequently need to be booted, and when patches to the underlying Operating System (OS) are needed, the ATM may require a boot from a location (memory stick or portable disc) other than the hard disk where the OS is stored.

Booting from a location other than the hard disk can create a significant security breach at the ATM. For example, an intruder may mimic the authentic OS stored on the hard disk with a compromised OS provided on a memory stick (such as a Universal Serial Bus (USB) device) and inserted into a USB port of the ATM. The compromised OS may replace the core ATM application (driver program) with a bogus ATM application that instructs the ATM dispenser to continually dispense cash until the ATM is depleted of stored currency. This is but one example as many other types of security breaches can occur when the ATM is booted from a location other than the hard disk of the ATM.

Unfortunately, some system firmware of ATMs will detect a loaded disc or interfaced memory stick during initial boot and automatically boot from the disc or the memory stick. Other ATMs may include system firmware that is configured to present a password screen when the operator attempts to configure the ATM to allow boot from a disk or memory stick, but once the password is successfully supplied to allow boot from a location other than the hard disk, the system firmware does not require any subsequent password for subsequently booting the ATM from an alternative location; this means that an intruder can boot from an alternative location after the ATM configured to allow boot from an alternative location where a valid password was provided.

In either of the above existing approaches, the ATM is left susceptible to security breaches because the conventional operation and configuration of the ATM's system firmware permits booting the ATM from a location other than the hard disk of the ATM.

SUMMARY

In various embodiments, methods and a Self-Service Terminal for system firmware one-time boot processing are presented.

According to an embodiment, a method for system firmware one-time boot processing is presented. Specifically, a change is detected during a boot of a device that changes a predefined location from where a resource is to be loaded from. Next, a determination is made as to whether to load the resource from a changed location or from the predefined location based on an operator-supplied credential.

DETAILED DESCRIPTION

Figure 1:
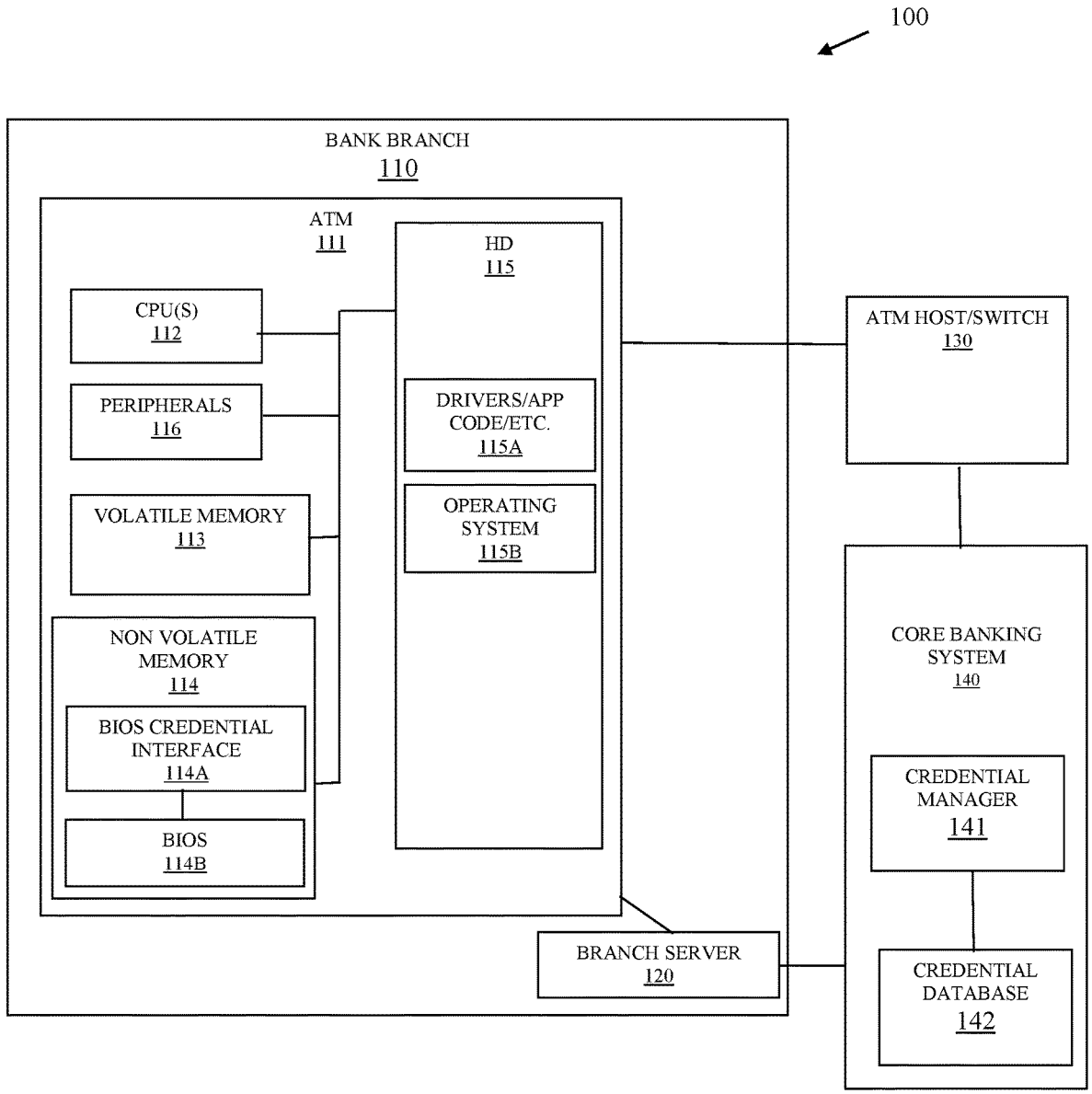
FIG. 1 is a diagram of a banking system for system firmware one-time boot processing on an Automated Teller Machine (ATM), according to an example embodiment.

FIG. 1 is a diagram of a banking system 100 for system firmware one-time boot processing on an ATM, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of BIOS one-time boot processing, presented herein and below.

It is to be noted that the FIG. 1 is presented and discussed with reference to a BIOS but BIOS can include UEFI or any system firmware that performs boot processing of a computing device.

The banking system 100 includes a bank branch 110, an ATM host/switch 130, and a core banking system 140. The bank branch 110 includes: an ATM 111 and a branch server 120.

The ATM 111 includes one or more Central Processing Units (CPU(s) 112, volatile memory 113, non-volatile memory 114, a Hard Drive (HD) 115 (which may or may not be encrypted and dynamically decrypted as needed), and multiple peripheral devices 116. The non-volatile memory 114 includes new and novel BIOS credential interface 114A and a BIOS 114B. The HD 115 includes drivers/application code/etc. 115A and an operating system (OS) 115B.

During operation, the BIOS 114B includes a key (credential) that it expects to be entered through an interface to the ATM 111 when the BIOS 114B is initiated from within the non-volatile memory 114. If the credential is properly matched to what is expected by the BIOS 114B (hashed value or stored value for the credential), then the BIOS 114 proceeds to load the OS 115B from the HD 115 for execution in the volatile memory 113 by the CPUs 112, the OS 115B and/or the BIOS 114 will also load device drivers 115A for the peripherals 116 of the ATM 111. The peripherals 116 can include a variety of devices, such as but not limited to, an encrypted PINPAD, a touchscreen, a receipt printer, a cash dispenser, a media recycler, a deposit module, and other peripheral devices 116.

Typically, the software modules or scripts for changing the credential that is needed for accessing the BIOS 114B and the credential itself (or a hash value for the credential) resides on and never leaves the ATM 111. Sometimes, the credential is separately administered for the BIOS 114B of the ATM 111 through the credential manager 141 accessing the credential database 142 and interacting with the branch server 120 that interacts with the ATM 111.

Once the BIOS 114B is properly authenticated and initiated within the non-volatile memory 114, The BOIS 114B attempts to load the OS 115B.

However, as discussed in detail above, when a conventional loaded BIOS detects a memory device or a disc present in one of the peripherals 116 during boot of the ATM 111, a conventional BIOS will present an interface to an operator of the ATM 111 for booting from the disc or the memory device, or a conventional BIOS may require a password just once (to enable of such boot) and then never require such a password for all subsequent such boots of the ATM 111. The location for a resource during boot can also be from a network-based location (when the ATM 111 has access to a network connection during the boot processing.

This conventional BIOS processing is modified and enhanced with the BIOS 114B as follows.

Specifically, the BIOS 114B is enhanced to enforce a policy condition that requires a credential (such as a password or key) every time an operator of the ATM 111 requests booting the ATM 111 from a location other than the HD 115 (wherein the known protected OS 115B resides). So, if an operator provides a valid password during a boot of the ATM 111 for booting the ATM 111 from a USB memory stick (interfaced to a USB peripheral port of the ATM 111), the same operator or a different operator is required during any subsequent boot to provide a valid password before the BIOS 114B will boot the ATM 111 from a memory device or a disc. That is, the BIOS 114 never permits the ATM 111 to boot from a location other than the HD 115 unless a valid password for performing such an operation is provided each time such a boot is requested. This prevents a malicious OS or malicious software resources from ever being loaded to the ATM 111 during the boot process because no resource loads to the ATM 111 from anywhere other than the HD 115 unless a valid and authorized credential is provided to the BIOS credential interface 114A during the pre-boot processing, which is controlled by the BIOS 114B.

In an embodiment, the credential used for allowing the BIOS 114B to boot from an alternative location other than the HD 115 can be periodically or randomly changed. For example, the credential manager 141 may receive a notice that the ATM 111 was booted from a memory device or disc from a boot log obtained by the branch server 120. The credential manager 141 may then change what the acceptable credential is for a next attempted boot of the ATM 111 and update the credential database 142. The changed credential is sent from the credential manager 141 to the branch server 120, and the branch server stores the new credential on the HD 115 in a location that BIOS credential interface 114A uses to compare against any operator-supplied credential. This process (remote credential changing) and credential verification can include a variety of different cryptographic processes and hashing processes for which the BIOS credential interface 114A is configured to independently perform against any operator-supplied credential.

In an embodiment of the last embodiment, the BIOS credential interface 114A may be configured to obtain a credential to compare against an operator-supplied credential from an offset on the HD 115 and update the offset each time a valid operator-supplied credential is validated for a successful boot of the ATM 111 from a location other than the HD 115. That is, the HD 115 includes a list of valid credentials and after a credential is successfully used a new credential in the list is obtained as a next valid credential.

The list can be updated manually by a service engineer that visits the ATM 111 and performs the authorized action to update the list or the list can be updated remotely through the credential manager 141 (as discussed above). Moreover, the BIOS credential interface 114A may be configured to reset the offset back to an original offset value once a currently maintained offset value exceeds a predefined amount. The current offset value may be stored in a known and different offset location within the HD 115 that the BIOS credential interface 114A is configured to maintain.

In an embodiment of any of the previous embodiments, the credential itself is never stored or known to the BIOS credential interface 114A; rather, the BIOS credential interface 114A is configured to perform predefined hashing operations against any operated-supplied credential to arrive at a value and the HD 115 maintains a valid value at a predefined offset location. This can also be a list of valid values properly identified by the current offset value maintained by the BIOS credential interface 114A at a known location on the HD 115 (as previously discussed above).

It may also be where a public key is stored in the BIOS 114B and any attempt to initiate a one-time boot requires that a signature be provided such that the public key in the BIOS 114B can be used to verify the provided signature.

The BIOS 114B and the BIOS credential interface 114A are configure to process in such a manner that whenever the boot order is changed from the preconfigured BIOS order that changes where a resource (such as the OS 115B) is to be acquired for loading into volatile memory 113 during a boot of the ATM 111, an operator-supplied credential/password is required to be authenticated before the preconfigured BIOS order is changed.

These and other embodiments will now be discussed with reference to the FIGS. 2-4.

Figure 2:
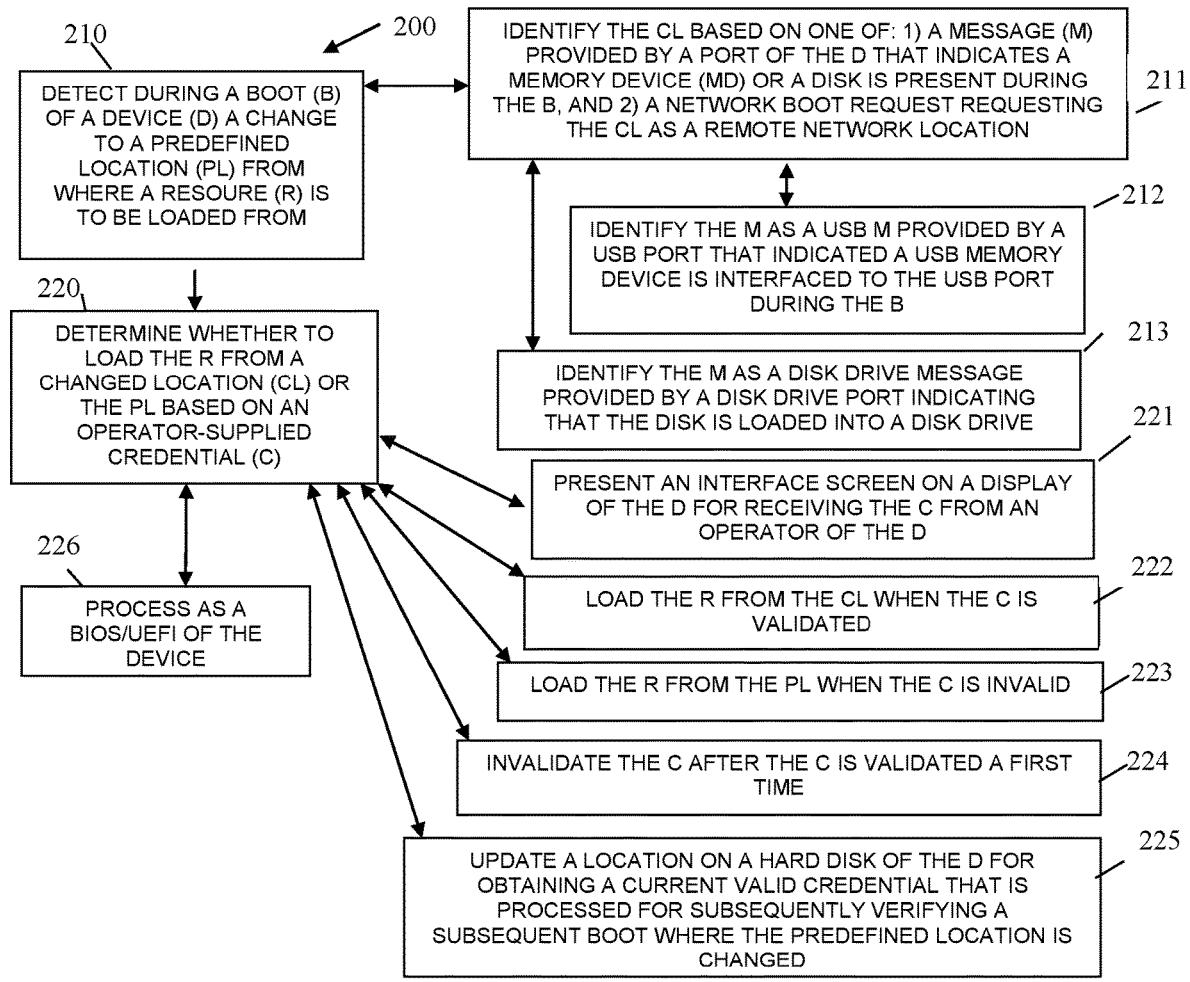
FIG. 2 is a diagram of a method for system firmware one-time boot processing, according to an example embodiment.

FIG. 2 is a diagram of a method 200 for system firmware one-time boot processing, according to an example embodiment. The software module(s) that implements the method 200 is referred to as a "Self-Service Terminal (SST) firmware resource order manager." The SST firmware resource order manager is implemented as executable instructions programmed and residing within memory and/or a non-transitory computer-readable (processor-readable) storage medium and executed by one or more processors of a device. The processor(s) of the device that executes the SST firmware resource order manager are specifically configured and programmed to process the SST firmware resource order manager. The SST firmware resource order manager may have access to one or more network connections during its processing. The network connections can be wired, wireless, or a combination of wired and wireless.

In an embodiment, the device that executes the SST firmware resource order manager is the ATM 111.

In an embodiment, the device that executes the SST firmware resource order manager is a SST. In an embodiment, the SST is a kiosk.

In an embodiment, the device that executes the SST firmware resource order manager is a Point-Of-Sale (POS) terminal.

In an embodiment, the SST firmware resource order manager is all of or some combination of the BIOS credential interface 114A and the BIOS 114B.

In an embodiment, the device that executes the SST firmware resource order manager is independent of a core banking system 140 and a field engineer's job system.

In an embodiment, the SST firmware resource order manager is implemented within or as an enhancement to a BIOS or an UEFI.

At 210, the SST firmware resource order manager detects, during a boot of the device (SST) a change to a predefined location from where a resource is to be loaded from. In an embodiment, the resource is the OS. In an embodiment, the resource is a peripheral driver of the SST.

According to an embodiment, at 211, the SST firmware resource order manager identifies the changed location based on one of: 1) a message provided by a peripheral port of the SST that indicates a memory device is present during the boot and that the resource is to be loaded into volatile memory of the SST during the boot processing from the memory device; and 2) a network boot request that attempts to boot from a remote network location as the current location.

In an embodiment of 211 and at 212, the SST firmware resource order manager identifies the message as a USB message provided by a USB port that indicates a USB memory device is interfaced to the USB port during the boot process.

In another embodiment of 211 and at 213, the SST firmware resource order manager identifies the message as a disk drive message provided by a disk drive port indicating that the disk is loaded into a disk drive and that the resource is to be loaded into volatile memory of the SST during the boot processing from the disk loaded in the disk drive.

In an embodiment, the SST firmware resource order manager identifies the current location as a remote network connection during a boot from a network location request. This assumes that the SST has a network connection during boot processing.

At 220, the SST firmware resource order manager determines whether to load the resource from a changed location or a predefined location based on an operator-supplied credential. The predefined location being the location that the BIOS/UEFI is configured to load the resource from. In an embodiment, the predefined location is the hard disk of the SST.

It is noted that as used herein a "hard disk" can include a mechanical hard disk drive (HDD) or a solid state drive (SSD).

In an embodiment, at 221, the SST firmware resource order manager presents an interface screen on a display of the SST for receiving the operated-supplied credential from an operator of the SST. This occurs during the boot processing being managed by the BIOS/UEFI.

In an embodiment, at 222, the SST firmware resource order manager loads the resource from the changed location when the operator-supplied credential is validated by the SST BIOS resource order manager as being authentic.

In an embodiment, at 223, the SST firmware resource order manager loads the resource from the predefined location when the operator-supplied credential is invalid or not capable of being authenticated by the SST firmware resource order manager.

In an embodiment, at 224, SST firmware resource order manager invalidates the operator-supplied credential after the operator-supplied credential is validated for a first time. This is a one-time password valid for changing the loading of the resources for one boot cycle and after that boot cycle, the credential is no longer valid for subsequent boot cycles of the SST.

In an embodiment, at 225, the SST firmware resource order manager updates a location on a hard disk for the SST for obtaining a current valid credential that is processed for subsequently verifying a subsequent boot of the SST where the predefined location is changed. This can be done by the SST firmware resource order manager maintaining an offset into the hard disk to locate a current valid credential that can change the location for loading a resource from the predefined hard disk (or hard drive) to an alternative location during a boot. The current offset value can be stored at yet another location on the hard disk, such that it is updated and available to the SST firmware resource order manager during each new boot cycle. This was also described as an embodiment above with the discussion of the FIG. 1.

According to an embodiment, the SST firmware resource order manager processes as a portion of the BIOS/UEFI for the SST such that the SST firmware resource order manager performs the boot process for the SST.

Figure 3:
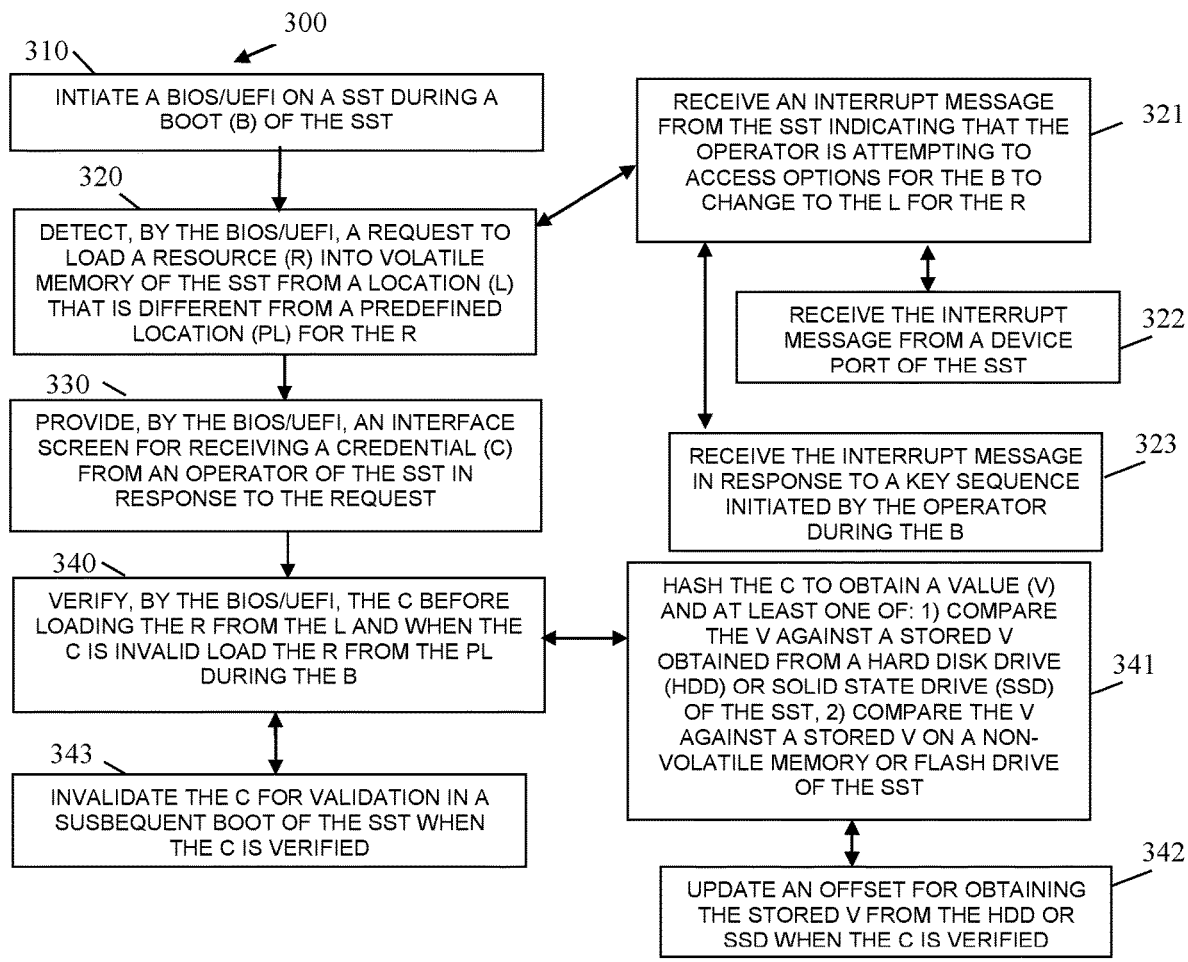
FIG. 3 is a diagram of another method for system firmware one-time boot processing, according to an example embodiment.

FIG. 3 is a diagram of another method 300 for system firmware one-time boot processing, according to an example embodiment. The software module(s) that implements the method 300 is referred to as a "SST system firmware credential agent." The SST system firmware credential agent is implemented as executable instructions programmed and residing within memory and/or a non-transitory computer-readable (processor-readable) storage medium and executed by one or more processors of a device. The processors that execute the SST system firmware credential agent are specifically configured and programmed to process the SST system firmware credential agent. The SST system firmware credential agent has access to one or more network connections during its processing. The network connections can be wired, wireless, or a combination of wired and wireless.

In an embodiment, the device that executes the SST system firmware credential agent is an SST. In an embodiment, the SST is the ATM 111 of the FIG. 1. In an embodiment, the SST is a kiosk.

In an embodiment, the device that executes the SST system firmware credential agent is a POS terminal.

In an embodiment, the SST system firmware credential agent is all or some combination of the BIOS credential interface 114A and the BIOS 114B of the FIG. 1.

At 310, the SST system firmware credential agent initiates system firmware on a SST during a boot of the SST (such as initiating a BIOS or an UEFI).

At 320, the BIOS/UEFI detects a request to load a resource into volatile memory of the SST from a location that is different from a predefined location defined for the resource for boot processing. In an embodiment, the resource is an OS. In an embodiment, the resource is a peripheral driver of a peripheral device of the SST.

According to an embodiment, at 321, the BIOS/UEFI receives an interrupt message from the SST during the boot processing indicating that the operator of the SST is attempting to access options for the boot processing to change the location from where the resource is to be loaded during the boot.

In an embodiment of 321 and at 322, the BIOS/UEFI receives the interrupt message from a device port of the SST during the boot processing.

In an embodiment of 321 and at 323, the BIOS/UEFI receives the interrupt message in response to a predefined key sequence initiated by the operator during the boot.

At 330, the BIOS/UEFI provides an interface screen on a display of the SST for receiving a credential from an operator of the SST in response to receiving the request at 320.

At 340, the BIOS/UEFI verifies the credential before loading the resource from the location and when the credential is invalid (incapable of being authenticated by the BIOS/UEFI), the BIOS/UEFI loads the resources from the predefined location during the boot or boot processing.

In an embodiment, at 341, the BIOS/UEFI hashes or performs hashing operations on the operator-supplied credential to obtain a computed value. The BIOS/UEFI then compares the computed value against one of: 1) a stored value obtained from a predefined location on the hard disk of the SST for purposes of verifying the credential, and 2) a stored value obtained from a non-volatile storage or flash memory of the SST.

In an embodiment of 341 and at 341, the BIOS/UEFI updates an offset value for obtaining the stored value from the hard disk when the credential is successfully verified. This was described above with the FIG. 1 and is a situation where the BIOS/UEFI is maintaining a current offset value into the hard disk for obtaining a stored value to verify a credential. The current offset value can be stored in an entirely separate location for retrieval by the BIOS/UEFI on subsequent boots.

In an embodiment, at 343, the BIOS/UEFI invalidates the credential for validation in subsequent boots of the SST when the credential is verified successfully. This is a one-time credential that changes each time a boot loads the resource from a location that is not predefined within the BIOS/UEFI.

Figure 4:
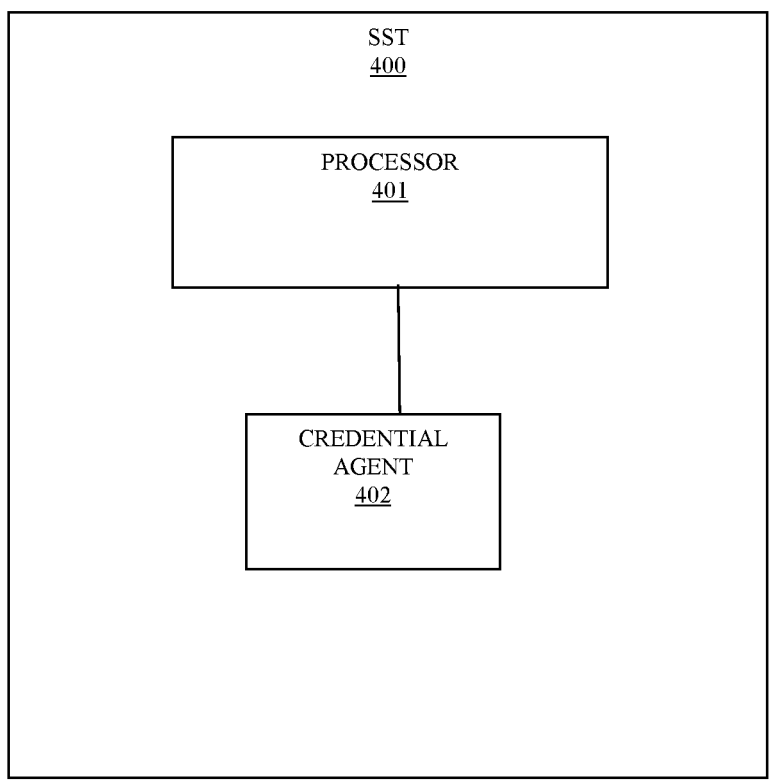
FIG. 4 is a diagram of a Self-Service Terminal (SST), according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 may communicate over one or more networks, which can be wired, wireless, or a combination of wired and wireless.

In an embodiment, the SST 400 lacks any network connectivity during one mode of operation where the SST 400 is being booted or at least lacks any network connectivity during the boot process (pre-boot).

In an embodiment, the SST 400 is the ATM 111 of the FIG. 1.

In an embodiment, the SST 400 is a kiosk.

In an embodiment, the SST 400 is a POS terminal.

The SST 400 includes a processor 401 and a credential agent 402.

The credential agent 402 is adapted and configured to: 3) execute on the hardware processor 401, 2) initiate a BIOS/UEFI on the SST 400 in response to a boot of the SST, and 3) force during processing of the BIOS/UEFI and during the boot a condition that requires a validated operator-supplied credential when an attempt is made to load a resource from a location that is external to a hard disk (HDD or SSD) of the SST 400 during the boot.

In an embodiment, the credential agent 402 is further configured, in 3) to: present an interface on a display of the SST 400 for receiving the operator-supplied credential In an embodiment, the credential agent 402 is all or some combination of: the BIOS credential interface 114A, the BIOS 114, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting during a boot of a device a requested change to a predefined location from where a resource is to be loaded from during the boot;
   identifying the requested change as a remote network location associated with a network location that is remote from the device;
   obtaining an operator-supplied credential based on the requested change;
   obtaining an offset value from an offset location on the device;
   obtaining a stored hash value from a second offset location identified from the offset value;
   hashing the operator-supplied credential and obtaining a calculated hash value;
   comparing the calculated hash value against the stored hash value; and
   determining whether to load the resource from the remote network location or the predefined location based on the comparing, wherein determining further includes invalidating the operator-supplied credential after the operator-supplied credential is validated a first time, wherein invalidating further includes updating the offset value as an updated offset value in the offset location, wherein the updated offset value identifies a third offset location on a hard disk of the device for obtaining a second stored hash value associated with a subsequent valid credential that is processed for subsequently verifying a subsequent boot where the predefined location is changed.

2. The method of claim 1, wherein determining further includes presenting an interface screen on a display of the device for receiving the operator-supplied credential from an operator of the device.

3. The method of claim 1, wherein determining further includes loading the resource from the remote network location when the operator-supplied credential is validated.

4. The method of claim 1, wherein determining further includes loading the resource from the predefined location when the operator-supplied credential is invalid.

5. The method of claim 1 further comprising, processing the method as a Basic Input/Output System (BIOS) or a Unified Extensible Firmware Interface (UEFI) of the device.

6. A method, comprising:
initiating a Basic Input/Output System (BIOS)/Unified Extensible Firmware Interface (UEFI) on a Self-Service Terminal (SST) during a boot of the SST;
detecting, by the BIOS/UEFI, a request to load a resource into volatile memory of the SST from a location that is different from a predefined location for the resource;
providing, by the BIOS/UEFI, an interface screen for receiving a credential from an operator of the SST in response to the request;
obtaining, by the BIOS/UEFI, an offset value from an offset location on the device;
obtaining, by the BIOS/UEFI, a stored hash value from a second offset location identified from the offset value;
hashing, by the BIOS/UEFI, the credential and obtaining a calculated hash value;
comparing, by the BIOS/UEFI, the calculated hash value against the stored hash value;
verifying, by the BIOS/UEFI, the stored hash value matches the calculated hash value before loading the resource from the location and when the stored hash value does not match the calculated hash value loading the resource from the predefined location during the boot; and
randomly changing the credential needed for booting the SST from the location during a subsequent boot by producing a second stored hash value for a randomly changed credential, generating a second offset value, storing the second offset value in the offset location, and storing the second stored hash value in a third offset location identified by the second offset value.

7. The method of claim 6, wherein detecting further includes receiving an interrupt message from the SST indicating that the operator is attempting to access options for the boot to change to the location for the resource.

8. The method of claim 7, wherein receiving further includes receiving the interrupt message from a device port of the SST.

9. The method of claim 7, wherein receiving further includes receiving the interrupt message in response to a key sequence initiated by the operator during the boot.

10. The method of claim 6, wherein verifying further includes invalidating the credential for validation in the subsequent boot of the SST when the credential is verified.

11. A Self-Service Terminal (SST), comprising:
a processor; and
a credential agent configured to:
  i) execute on the processor of the SST,
  ii) initiate a Basic Input/Output System (BIOS)/Unified Extensible Firmware Interface (UEFI) on the SST in response to a boot of the SST, and
  iii) force during processing of the BIOS/UEFI and during the boot a condition that requires a validated operator-supplied credential when an attempt is made to load a resource from a location that is external to a hard disk of the SST during the boot, wherein the location is a remote network location accessible over a network connection from the SST by:
    obtaining an offset value from an offset location on the SST;
    obtaining a stored hash value from a second offset location identified from the offset value;
    hashing an operator-supplied credential and obtaining a calculated hash value;
    comparing the calculated hash value against the stored hash value and when matched identifying the operator-supplied credential as the validated operator-supplied credential and loading the resource from the location and when unmatched, loading the resource from a predefined location on the SST;
    invalidating the operator-supplied credential after the operator-supplied credential is validated a first time by updating the offset value as an updated offset value in the offset location, wherein the updated offset value identifies a third offset location on the hard disk of the SST for obtaining a second stored hash value associated with a subsequent valid credential that is processed for subsequently verifying a subsequent boot where the predefined location is changed.

12. The SST of claim 11, wherein the credential agent is further configured, in iii) to:
present an interface on a display of the SST for receiving the operator-supplied credential.

13. The SST of claim 11, wherein the SST is an ATM.

* * * * *